(No Model.)
G. EISERER.
LIQUID SCALE.
No. 579,745. Patented Mar. 30, 1897.
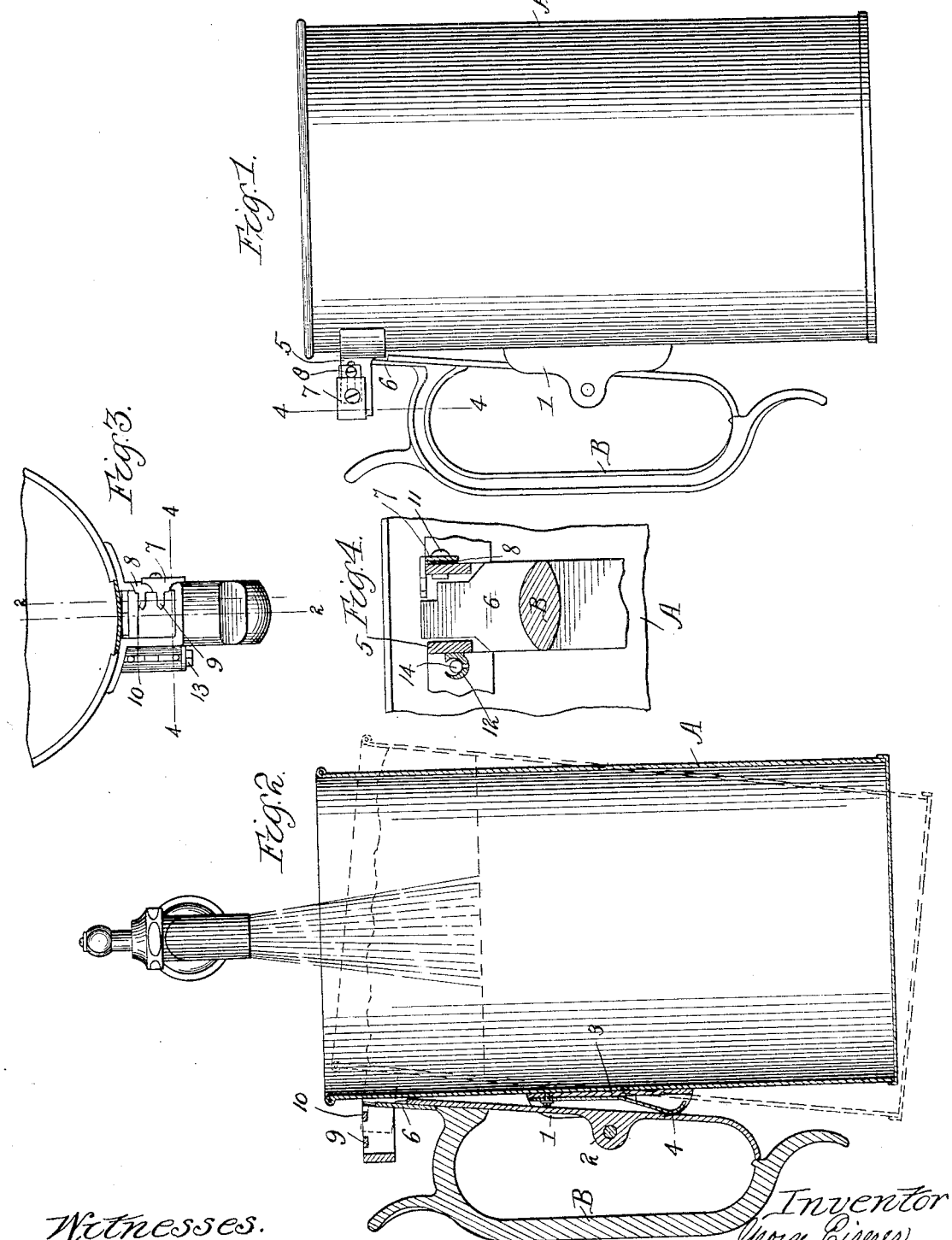
Witnesses.
Wm. M. Rheem
H. F. Melvin
Inventor
George Eiserer
by
Rudolph
atty.

UNITED STATES PATENT OFFICE.

GEORGE EISERER, OF CHICAGO, ILLINOIS.

LIQUID-SCALE.

SPECIFICATION forming part of Letters Patent No. 579,745, dated March 30, 1897.

Application filed August 14, 1896. Serial No. 602,796. (No model.)

*To all whom it may concern:*

Be it known that I, GEORGE EISERER, a citizen of the United States, residing at Chicago, in the county of Cook and State of Illinois, have invented certain new and useful Improvements in Liquid-Scales; and I do hereby declare the following to be a full, clear, and exact description of the invention, such as will enable others skilled in the art to which it appertains to make and use the same.

My invention relates to a novel construction in a liquid-scale, the object being to provide a device which is especially adapted for measuring foaming liquors, such as beer and ale; and it consists in the features of construction and combinations of parts hereinafter fully described and claimed.

In the accompanying drawings, illustrating my invention, Figure 1 is a side elevation of a device constructed in accordance with my invention. Fig. 2 is a vertical section of the same on the line 2 2 of Fig. 3. Fig. 3 is a top plan view of the portion of my scale adjacent to the handle and illustrating the devices for determining the weight of the liquid contained in the device. Fig. 4 is a detail sectional view of the lines 4 4 of Figs. 1 and 3.

Referring now to said drawings, A indicates a cylindrical vessel or measure which is adapted to contain the liquid, and to which a handle B is pivotally secured by means of outwardly-extending ears 1 on the outer face of said vessel A about midway between its upper and lower ends, between which a pivot-lug 2 on the inner portion of said handle B is mounted. A spring 3 is secured at its upper end between the upper portions of said ears 1, and at its lower end is bent outwardly, as at 4, and bears against said handle B below said pivot-lug 2.

Secured to the upper end portion of said measure A, in alinement with said handle B and ears 1, is an outwardly-extending loop 5, in which a projection 6 on the upper end portion of said handle B is adapted to move. Mounted upon said lug 5 are plates 7 and 8, which are provided with inwardly-extending indicating-fingers 9 and 10, by means of which said projection 6 registers the weight of liquid contained in said measure A. One of the side walls of said loop 5 is slotted, as is also said plate 8, whereby the adjustment of said plates 7 and 8, and consequently said indicating-fingers 9 and 10, is permitted. Said plates 7 and 8 are secured to said loop 5 by means of bolts 11, passing through the same and through said slots in said loop 5 and plate 8.

Mounted upon the opposite wall of said loop 5 to that on which said plates 7 and 8 are mounted is what I term a "level" 12, of practically tubular form, provided with seats at its upper and lower faces and closed at its outer end by means of a screw-plug 13. A ball 14 is movably mounted within said level and is adapted to indicate by its position within the same when said vessel A is exactly perpendicular.

The operation of my device is as follows: In order to weigh the liquid, the device is held in the hand in a vertical position and the liquid drawn into the same. The weight of the liquid will depress the measure A and cause it to turn on its pivot against the action of the spring 3 and cause the fingers 10 and 9 to successively come into alinement with the projection 6. For instance, if the finger 10 has been set to register when one pound of liquid is contained in the measure the dispenser will ascertain that he has dispensed one pound as soon as said finger 10 comes into alinement with said projection 6. If said finger 9 has been set to register when two pounds of liquid are contained in the measure A, the same will indicate that this quantity has been dispensed as soon as it comes into alinement with said projection 6. Said measure A is preferably made of greater capacity than the largest amount of liquid it is desired to weigh therein, so as to leave sufficient room for foam, so that the slight tipping of the same, as shown in dotted lines in Fig. 2, while receiving the liquid does not detract from its practicability, since it can never tip sufficiently to cause the liquid to run out.

By means of my device liquor can be weighed exactly, irrespective of foam, and it enables the dispenser to determine whether his barrel or keg of liquor is short or not. In this manner not only the dispenser but the consumer also is enabled to obtain full measure.

I claim as my invention—

1. In a device of the kind specified, a vessel provided with parallel ears at about its middle portion and with a projection near its upper end provided with indicators, a handle pivoted between said ears and provided at its upper end with an indicator adapted to register with said indicators on said vessel, and a spring interposed between said handle and said vessel and adapted to bear against said handle below said pivot to hold the indicator thereon normally at the inner limit of its movement with relation to said vessel.

2. In a device of the kind specified, a vessel provided at about its middle portion with outwardly-extending ears, an outwardly-extending loop at the upper end of said vessel, adjustable indicators on said loop, a handle pivoted between said ears and provided at its upper end with an indicator adapted to enter said loop and register with the adjustable indicators thereon, and a flat spring secured between said ears and adapted to bear against said handle below the pivot thereof to hold the indicator thereon normally at the inner limit of its movement with relation to said vessel.

3. In a device of the kind specified, a vessel provided with parallel ears at about its middle portion and with a projection at its upper end provided with indicators, a handle pivoted between said ears and provided at its upper end with an indicator adapted to register with said indicators on said vessel, a spring interposed between said handle and said vessel and adapted to bear against said handle below said pivot to hold the indicator thereon normally at the inner limit of its movement with relation to said vessel, and a level mounted upon said projection on said vessel and adapted to indicate when the same is in a vertical position.

In testimony whereof I affix my signature in presence of two witnesses.

GEORGE EISERER.

Witnesses:
RUDOLPH WM. LOTZ,
E. J. BOILEAU.